INVENTOR
JOHN J. NASH
BY
ATTORNEY

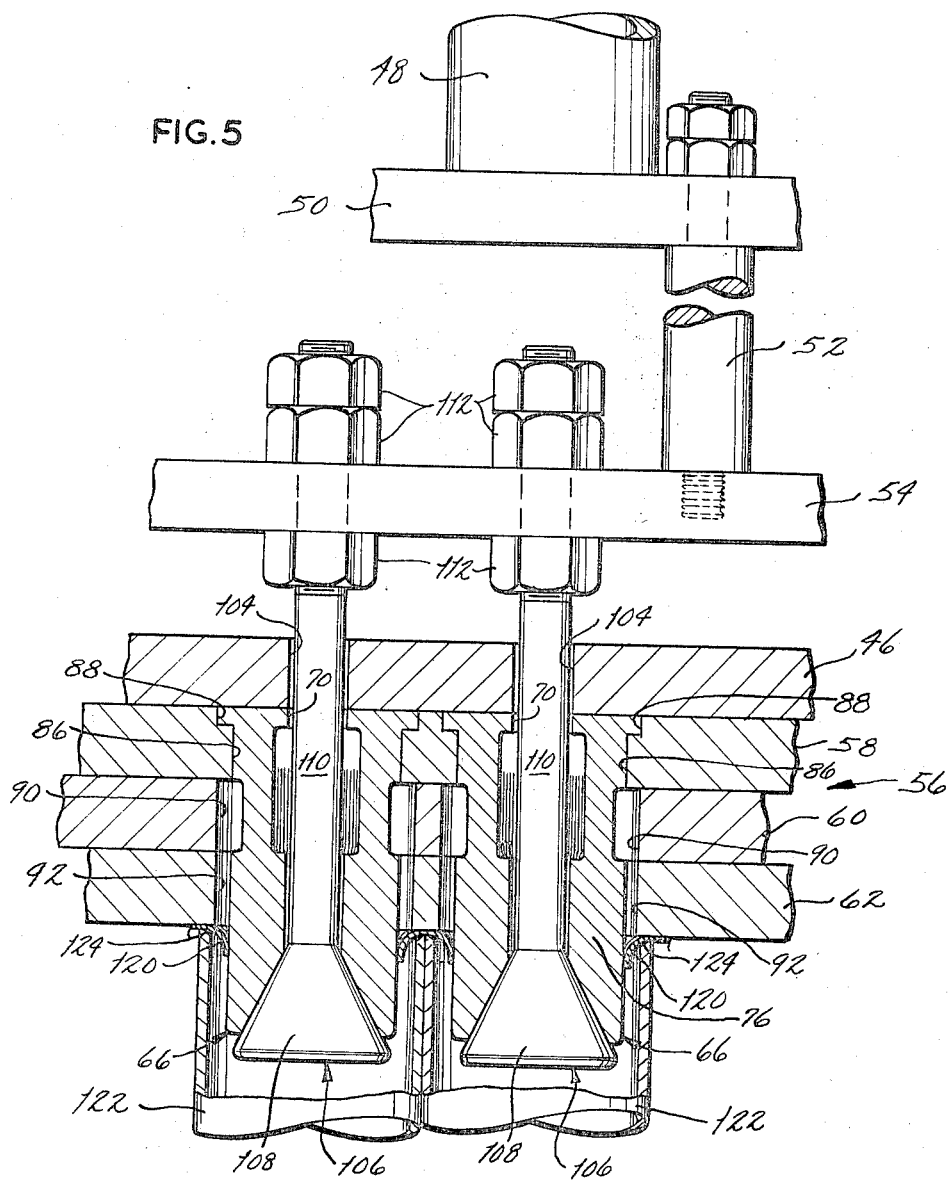

United States Patent Office 3,564,678
Patented Feb. 23, 1971

3,564,678
METHOD AND MACHINE FOR ASSEMBLING BULKHEAD TO ROCKET LAUNCHERS
John J. Nash, Ferguson, Mo., assignor to Alsco, Inc., St. Louis, Mo., a corporation of Delaware
Filed Feb. 7, 1969, Ser. No. 797,416
Int. Cl. B23p 13/00
U.S. Cl. 29—1.11
11 Claims

ABSTRACT OF THE DISCLOSURE

A machine for assembling and securing a bulkhead to the end of a rocket launcher is provided for use where the rocket launcher includes a bundle of cylindrical tubes and the bulkhead has a plurality of collar flanges registered with and protruding into the ends of the rocket tubes. The machine comprises a plurality of cylindrical collets adapted to register with and protrude inside the collar flanges of the bulkhead and being expandable radially to cause the collar flanges to press outwardly against the inner surfaces of the tubes to secure the bulkhead to the tubes. Each collet is expanded by a bell-shaped drawbar which is slidably movable within the collet and which cams the expandable walls of the collet outwardly during its longitudinal movement. The plurality of expanding collets in addition to securing bulkheads to ends of rocket tubes, it sizes the opening in bulkhead to permit the loading and firing of rocket without interference, it also assures center to center alignment of all firing tubes, and longitudinal alignment to maintain a consistent pattern of rockets when fired.

The method for securing the bulkhead to the rocket launcher includes placing it over the ends of the tube bundle with its collar flanges fitted loosely inside the ends of the tubes, inserting a plurality of expandable cylindrical collets inside the collar flanges, and moving the drawbars longitudinally to cause the cylindrical collet walls to expand.

This invention relates to a method and machine for assembling rocket launchers and more particularly to a method and machine for securing bulkheads to rocket launchers.

Military forces presently use rocket launchers which comprise a bundle of cylindrical tubes secured together and suspended beneath aircraft. Bulkheads are secured over the opposite ends of the tube bundles and include apertures arranged in registered alignment with the ends of the tubes. Two general types of rocket launchers are currently being manufactured. One is a reusable rocket launcher which includes aluminum tubes and aluminum bulkheads secured over the ends of the tubes. This invention relates to the second type of rocket launcher which is disposable and which includes paper tubes having metal bulkheads secured over their ends. Disposable rocket launchers are used only for one firing, but are advantageous because they are inexpensive to manufacture. Because they are used only once, disposable rocket launchers must be manufactured in large quantities. For this reason methods and machinery which provide quick and efficient construction of the rocket launchers are extremely desirable.

Among the several objects of the present invention may be noted the provision of a machine and method for securing bulkheads over the ends of a rocket launcher quickly and tightly; the provision of such a machine and method wherein the bulkheads are secured in such a manner that the inner ends of the rocket launching tubes are smooth so as not to obstruct the rockets during firing; the provision of such a machine and method wherein the bulkheads may be secured in such a manner as to protect the paper tubes from the rockets' exhaust during firing; the provision of such a method and machine wherein portions of the bulkheads protruding into the tubes are expanded to clamp the bulkheads onto the ends of the tubes; the provision of such a method and machine wherein a substantial expanding force can be applied to the portions of the bulkheads protruding within the tubes to insure a tight clamp; the provision of such a method and machine where hydraulic power can be used to provide the above mentioned expanding force; the provision of such a method and machine wherein the bulkheads are pressed axially onto the ends of the tube bundle to insure their solid securement; and the provision of such a machine which is durable in use and economical to manufacture. Other objects and features will be in part apparent and in part pointed out hereinafter.

The invention accordingly comprises the constructions and methods hereinafter described, the scope of the invention being indicated in the following claims.

In the accompanying drawings, in which one of various possible embodiments of the invention is illustrated, FIG. 1 is a perspective view of the machine for assembling rocket launchers;

FIG. 5 is a detail sectional view showing the operation of the drawbars within the collets; and FIG. 6 is a detail sectional view illustrating the position of the bulkhead collars after the bulkhead is secured to the end of the rocket launcher.

Corresponding reference characters indicate corresponding parts throughout the several views of the drawings.

Figure 1:
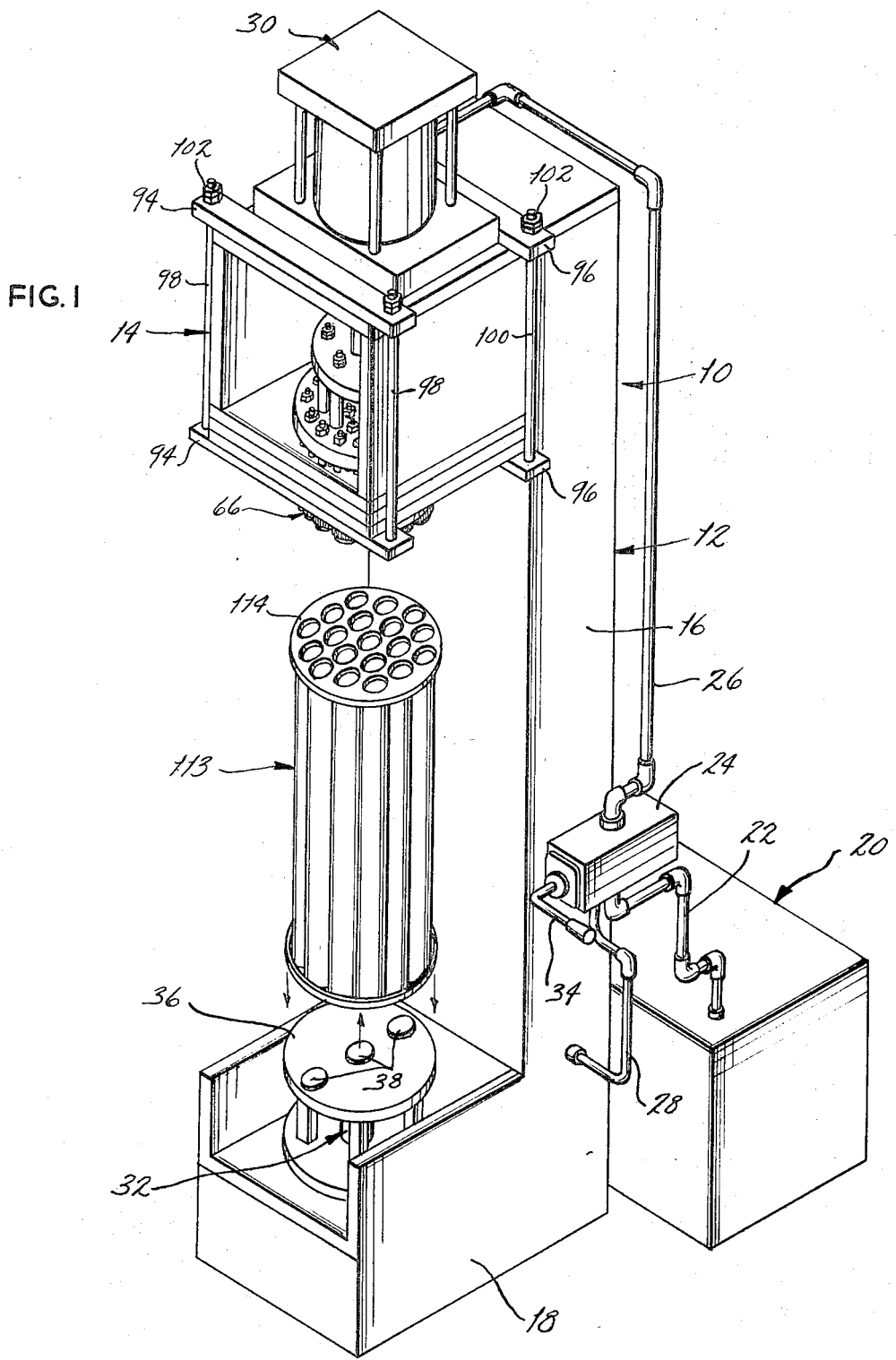

Numeral 10 designates a machine for securing bulkheads to the opposite ends of rocket launchers. It includes a frame member 12 having an upper frame 14, an intermediary frame 16 and a base frame 18. Behind frame 12 is a conventional hydraulic reservoir and pump assembly 20 which is not shown in detail due to its conventional construction. Extending from reservoir and pump assembly 20 is a hydraulic conduit 22 which leads to a three-position hydraulic valve 24. Leading from valve 24 are an upper hydraulic conduit 26 and a lower hydraulic conduit 28 which lead to an upper hydraulic drive assembly 30 and a lower hydraulic drive assembly 32, respectively. A valve handle 34 is provided on valve 24 and is movable through first, second and third positions. In its first position it cuts off the hydraulic fluid to both upper hydraulic drive assembly 30 and lower hydraulic drive assembly 32. In its second position fluid is introduced to lower hydraulic drive assembly 32 to actuate it. In its third position hydraulic fluid is introduced to upper hydraulic drive assembly 30.

A pedestal 36 is movably mounted to base frame 18 and is also secured to lower hydraulic drive assembly 32 so that upon actuation of lower hydraulic drive assembly 32 it will be moved upwardly towards upper frame 14. Pedestal 36 includes, on its upper surface, three guide plugs 38 which are adapted to fit inside the apertures of a rocket launcher assembly so as to hold it in a predetermined position.

Figure 2:
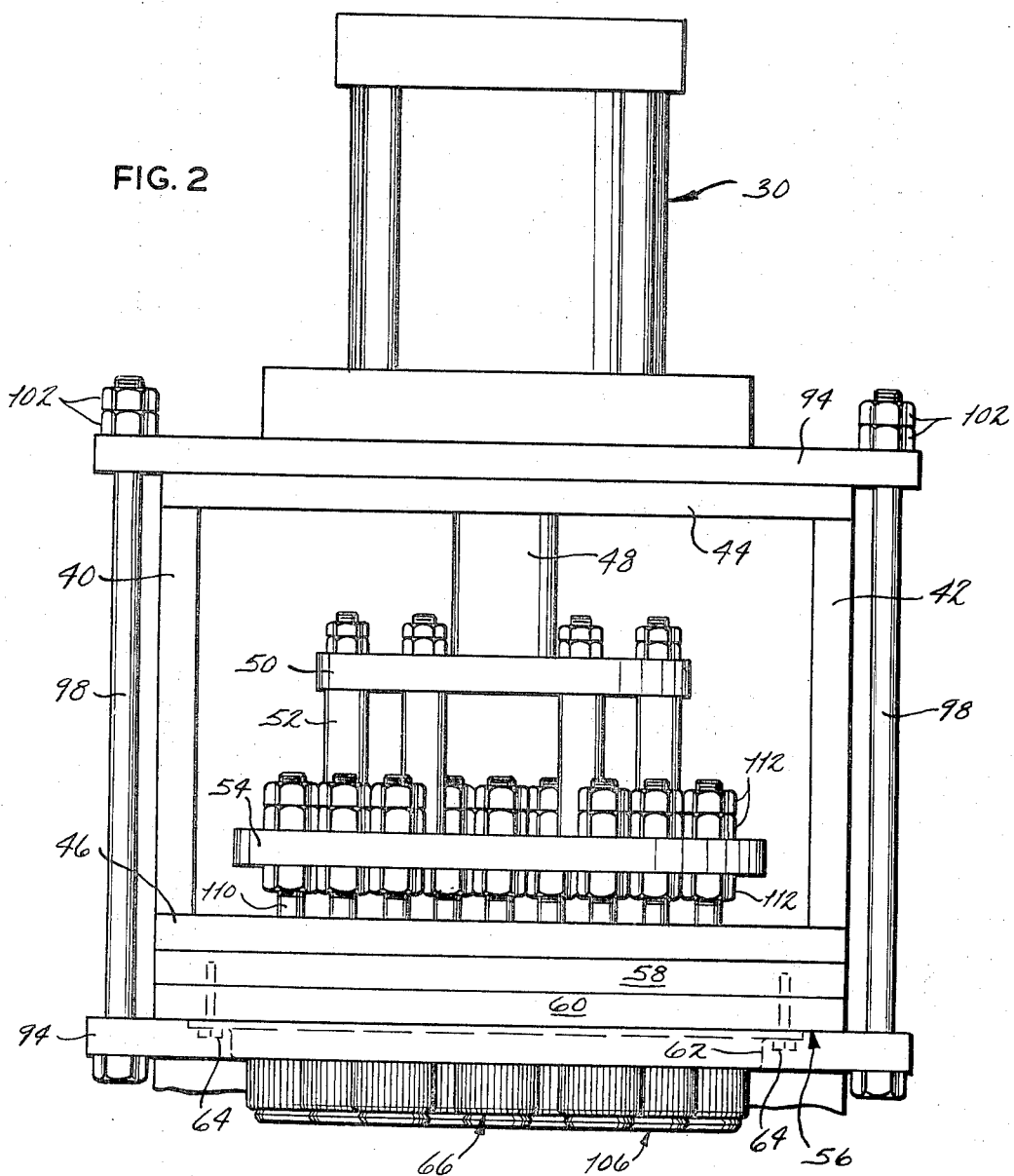
FIG. 2 is a detail view of the upper frame and the collet assembly.

Upper frame 14 is shaped like a rectangular box having side walls 40, 42, an upper wall 44, and a lower wall 46 (FIG. 2). Upper hydraulic drive assembly 30 is mounted on top of upper wall 44 and includes a piston 48 which extends downwardly through upper wall 44 and is rigidly secured at its lower end to an upper drive plate 50. The means of securing piston 48 to upper drive plate 50 may be any of those conventionally employed so long as the two members are rigidly connected to minimize the amount of play between them. A plurality of spacers 52 are bolted to upper drive plate 50 and extend downwardly therefrom where they are threaded into a lower drive plate 54. Thus upper drive plate 50 and lower drive plate 54 are rigidly secured to one another by spacers 52 so that actuation of upper hydraulic drive assembly 30 causes them to move upwardly and downwardly as a unit.

Below lower wall 46 is a collet mounting assembly 56 including an upper mounting plate 58, a spacer plate 60 and a circular pressure plate 62. The three plates of collet mounting assembly 56 are secured together by means of bolts 64. Any conventional securing means is satisfactory for fastening these plates together. Upper mounting plate 58 and spacer plate 60 are substantially rectangular in shape and conform to the rectangular shape of lower wall 46. Circular pressure plate 62 is of a diameter which is slightly greater than the diameter of the launcher bulkhead.

Figure 3:
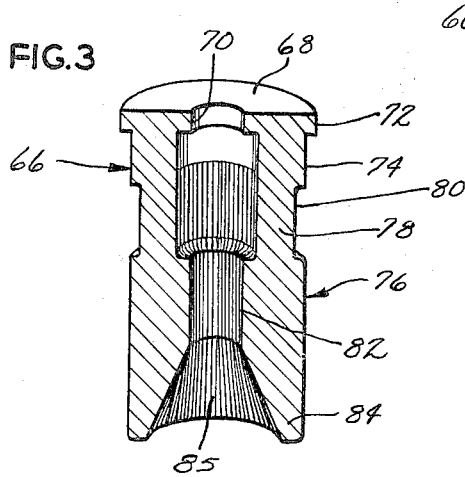
FIG. 3 is a detailed sectional view of one of the collets.

Referring to FIG. 3, an expandable collet 66 is provided having a substantially cylindrical shape. Collet 66 is of unitary construction and includes a top plate 68 at its upper end having a center aperture 70 therein providing communication into its interior. Top plate 68 forms a small annular flange 72 protruding radially around the circumference of the upper end of collet 66. Extending downwardly from top plate 68 is a cylindrical anchor portion 74 which has a plurality of spring fingers 76 extending downwardly from its lower edge. Spring fingers 76 form the lower cylindrical walls of collet 66. At the upper end of spring fingers 76 is a narrow portion 78 which forms an annular groove 80 around the outer peripheral edge of the cylindrical wall of collet 66. On the inwardly disposed face of each spring finger located approximately midway between its ends is an inwardly protruding portion 82. Inwardly protruding portion 82 tapers outwardly at the lower end 84 of spring fingers 76 so as to create a bell-shaped cavity 85 on the interior of collet 66. Annular groove 80 and narrow portion 78 of spring fingers 76 contribute to the ability of spring fingers 76 to spring outwardly when subjected to pressure in that direction. The preferred material for collet 66 is a tempered steel which provides resiliency and strength so that the collet may be expanded and contracted over a long period of time without breaking and without losing its resiliency.

Referring to FIG. 5, upper mounting plate 58 is provided with a plurality of apertures 86 having counterbores 88 which are sized to receive flanges 72 of collets 66 to limit their downward movement. Thus collets 66 protrude through apertures 86 with flanges 72 resting in counterbores 88. Spacer plate 60 and circular pressure plate 62 are provided with a plurality of apertures 90, 92, sized to surround the lower ends of collets 66. Apertures 90, 92, have diameters substantially larger than the diameters of collets 66 so as to permit expansion of spring fingers 76 radially outwardly with respect to the cylindrical axis of collets 66. Upper mounting plate 58, spacer plate 60, circular pressure plate 62 and collets 66 are secured to the bottom surface of lower wall 46 by means of two pair of reinforcing bars 94, 96, (FIGS. 1 and 2) which are joined together by two pair of reinforcing rods 98, 100, respectively. Threaded nuts 102 are secured on the opposite ends of reinforcing rods 98, 100, to provide solid securement of the aforementioned plates to the lower wall 46 of upper frame 14. Lower wall 46 includes a plurality of small diameter apertures 104 which are smaller in diameter than the top plates 68 of collets 66 but which are arranged in registered alignment over the cylindrical axes of collets 66. As can be seen in FIG. 5, collets 66 are held against upward movement by lower wall 46 and against downward movement by upper mounting plate 58.

Slidably mounted inside each collet 66 is a bell-shaped drawbar 106 having a bell-shaped portion 108 at its lower end and a shank portion 110 extending upwardly therefrom through center aperture 70 of collet 66, through small diameter aperture 104 of lower wall 46, and through apertures in lower drive plate 54 to which it is secured by threaded nuts 112. Bell-shaped portion 108 of drawbar 106 conforms to the inner bell-shaped cavity 85 provided at lower ends 84 of spring fingers 76 so that upward movement of drawbar 106 will pry spring fingers 76 radially outwardly with respect to the cylindrical axis of collet 66. Thus it can be seen that when upper hydraulic drive assembly 30 is actuated, lower drive plate 54 lifts all the drawbars 106 in unison, thereby causing all the collets 66 to be expanded in unison. It is not essential that drawbar 106 be bell-shaped in order to provide this camming action. Any combination of enlarged and diminished diameters of drawbar 106 will produce the same result as long as the inner cylindrical walls of spring fingers 76 conform to the shape of drawbar 106. In these configurations the enlarged portions of drawbars 106 will act as cams and the conforming inner surfaces of spring fingers 76 will function as cam-following surfaces.

Figure 4:
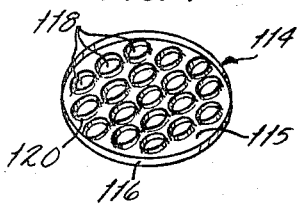
FIG. 4 is a detail perspective view of one of the bulkheads.

A typical rocket tube assembly 113 having a pair of bulkheads 114 positioned over its ends is illustrated in FIG. 1. In FIG. 4 bulkhead 114 is shown in an inverted position with its upwardly exposed face 115 being the face adapted to abut against the end of the tubes in rocket tube assembly 113. A peripheral rim flange 116 extends around the outer perimeter of bulkhead 114 and a plurality of apertures 118 are arranged in a pattern which corresponds to the ends of the tubes in rocket launcher tube assembly 113. Around each aperture 118 is a collar flange 120 which is of slightly less diameter than the circle formed by the inner surfaces of each tube in rocket tube assembly 113.

FIG. 5 illustrates the positioning of bulkhead 114 with respect to the end of rocket tube assembly 113. Rocket tube assembly 113 is comprised of a plurality of rocket launching tubes 122. Collar flanges 120 protrude inwardly into the interior or rocket launching tubes 122. The lower ends of collar flanges 120, as viewed in FIG. 5, have a diameter which is slightly smaller than the upper ends of collar flanges 120 so that they appear somewhat funnel-shaped or cone-shaped. Collar flanges 120 curve downwardly from builkhead 114 so that there is not an abrupt right angle at their extreme upper edges. Because collar flanges 120 are inwardly tapered at their lower ends they are adapted to be stretched radially more easily than if they were cylindrical in shape. The lower tapered ends of collar flanges 120 are stretched during the process of this invention until they take on a substantially cylindrical shape. The extreme ends of tubes 122 have chamfered edges 124 which conform to the curved shape of collar flanges 120, thereby providing a snug fit between collar flanges 120 and tubes 122.

In order to secure bulkheads 114 permanently to the ends of rocket tube assembly 113 the bulkheads are first manually placed on the ends of the rocket tube assembly with collar flanges 120 protruding into the ends of tubes 122 as described above. The rocket tube assembly is then placed on pedestal 36 with guide plugs 38 holding it in a predetermined position which places apertures 118 of bulkhead 114 in registered alignment below collets 66. Valve handle 34 is moved from its first position to its second position, thereby actuating lower hydraulic drive assembly 32 to cause pedestal 36 and rocket tube assembly 113 to rise upwardly until collets 66 slip inside collar flanges 120 which are seated inside rocket tubes 122 (FIG. 5). Pedestal 36 presses bulkhead 114 against pressure plate 62 with a predetermined force sufficient to insure that collar flanges 120 and collets 66 are forced into the ends of tubes 122 as far as they will go without damaging tubes 122. This pressure exerted by pedestal 36 insures that bulkheads 114 are positioned evenly on the ends of rocket tube assembly 113. Valve handle 34 is then moved to its third position which causes upper hydraulic drive assembly 30 to be actuated to cause drawbars 106 to be drawn upwardly within collets 66. As drawbars 106 move upwardly they pry spring arm 76 of collets 66 radially outwardly with respect to the cylindrical axes of collets 66. This radial expansion of collets 66 causes collar flanges 120 to be expanded radially, thereby causing them to press tightly against the inner surfaces of the walls of tubes 122. Because tubes 122 are formed from paper the expanding collar flanges 120 are partially embedded in the inner walls of tubes 122 (FIG. 6). The embedding of collar flanges 120 in the walls of tubes 122 provides a smooth inner surface at the mouth of each tube, thereby avoiding obstructions which might hinder the exit of a rocket from each tube 122. In addition collar flanges 120 provide a metallic covering over the extreme ends of rocket tubes 122 so that the blast from a rocket will not ignite the paper of tubes 122.

The longitudinal distance which drawbars 106 move is preset at a predetermined length which will cause collets 66 to be radially expanded from a first size slightly smaller than the inside diameter of collar flanges 120 to a second size slightly greater than the inside radius of the collar flanges. Because of the tapered shape of collar flanges 120, they are expanded a greater distance at their lower ends (as viewed in FIGS. 5 and 6) than at their upper ends. Thus, when the expansion process is completed, collar flanges 120 have been converted from a tapered shape to a substantially circular cylindrical shape.

The plurality of expanding collets in addition to securing bulkheads to ends of rocket tubes, it sizes the opening in bulkhead to permit the loading and firing of rocket without interference, it also assures center to center alignment of all firing tubes, and longitudinal alignment to maintain a consistent pattern of rockets when fired.

In view of the above, it will be seen that the several objects of the invention are achieved and other advantageous results attained.

What is claimed is:

1. A machine for securing a bulkhead over the end of a rocket launcher, said rocket launcher including a bundle of cylindrical tubes, said bulkhead having a plurality of collar flanges registered with and protruding within the ends of said rocket tubes of said bundle, said machine comprising a plurality of cylindrical collets adapted to register with and to protrude inside said collar flanges of said bulkhead; each of said collets being radially expandable from a first size slightly smaller in radius than the inside radius of said collar flanges to a second size slightly greater than the inside radius of said collar flanges; means for expanding said collets from their first size to their second size whereby said collets press said collar flanges outwardly tightly against the inner surfaces of said tubes to secure said bulkheads to said bundle of tubes.

2. The machine of claim 1 wherein a pedestal is provided for supporting said rocket launcher in a predetermined position so that said collar flanges of said bulkhead are in registered alignment with said plurality of collets, said pedestal being movable towards said plurality of collets to cause said collets to be pressed inside said collar flanges.

3. The machine of claim 1 wherein said collets include spring means which are adapted to yieldably expand radially outwardly.

4. The machine of claim 3 wherein said means for expanding each of said collets includes a cam member engaging cam-following surfaces on said spring means, said cam member being movable with respect to said collet to cause said spring means to cam inwardly and outwardly.

5. The machine of claim 4 wherein said cam member is inside said collet and is movable longitudinally with respect to the cylindrical axis of said collet.

6. The machine of claim 5 wherein said cam member is a drawbar having an outwardly tapering portion inside said collet, the cam-following surfaces of said spring means bearing against said outwardly tapering portion and being urged radially outwardly with respect to said collet when said drawbar moves longitudinally therein.

7. The machine of claim 1 wherein said means for expanding said collets include a plurality of drawbars mounted to a movable member and extending inside said collets, said collets being mounted on a stationary member, and said movable member being adapted to be driven by power means to cause said drawbars to move longitudinally with respect to the cylindrical axes of said collets.

8. The machine of claim 7 wherein said drawbars include enlarged diameter portions and diminished diameter portions within each collet, the inner surfaces of the walls of said collet conforming to the shape of said enlarged and diminished diameter portions so that longitudinal movement of said drawbars causes said walls of said collet to expand and contract.

9. The machine of claim 1 wherein each of said collets includes a cyindrical anchor portion at one end thereof and a plurality of spring fingers anchored at one of their ends to said anchor portion and extending longitudinally along said collet to form at least a portion of the cylindrical walls of said collet; said spring fingers being resilient so that they will yieldably spring outwardly with respect to the cylindrical axis of said collet.

10. A method for securing a bulkhead over the end of a rocket launcher comprising forming a bulkhead so that it includes a plurality of apertures adapted to register with the ends of a bundle of rocket launching tubes, the inner margins of said apertures including collar flanges which are slightly smaller in diameter than the inner surfaces of said tubes; placing said bulkhead over the end of said bundle of tubes with said aperture in registered alignment with the ends of said tubes and with said collar flanges matingly fitted loosely within said ends of said tubes; inserting a plurality of expandable cylindrical collets inside said collar flanges, said cylindrical collets including means for radially expanding their cylindrical walls; expanding said cylindrical collets radially while they are within said collar flanges so that they will deform said collar flanges radially outwardly against the inner surfaces of said tubes, thereby securing said bulkhead to said bundle of tubes.

11. The method of claim 10 including using expandable collets having bell-shaped drawbars longitudinally movable within said collets, said collets including inner cylindrical walls conforming in shape to said bell shape of said drawbars, the expansion of said collets being accomplished by sliding said drawbars longitudinally within said collets so that said bell-shaped drawbars pry the cylindrical walls of said collets radially outwardly.

References Cited

UNITED STATES PATENTS

| 2,405,399 | 8/1946 | Bugg et al. | 29—523UX |
| 2,686,353 | 8/1954 | Swarthout | 29—523UX |
| 2,767,462 | 10/1956 | Mathews | 29—523UX |
| 3,449,812 | 6/1969 | Hauschke et al. | 29—523X |

FRANK T. YOST, Primary Examiner

U.S. Cl. X.R.

29—523: 89—1.7